United States Patent
Salour et al.

(10) Patent No.: US 10,198,605 B1
(45) Date of Patent: Feb. 5, 2019

(54) ULTRA-LIGHTWEIGHT MUTUAL AUTHENTICATION PROTOCOL WITH SUBSTITUTION OPERATION

(71) Applicants: The Boeing Company, Chicago, IL (US); Missouri University of Science and Technology, Rolla, MO (US)

(72) Inventors: Ali Salour, Fenton, MO (US); Douglas D. Trimble, Saint Peters, MO (US); Jagannathan Sarangapani, Rolla, MO (US); Eyad S. Taqieddin, Irbid (JO)

(73) Assignees: The Boeing Company, Chicago, IL (US); Missouri University of Science and Technology, Rolla, MO (US)

( * ) Notice: Subject to any disclaimer, the term of this patent is extended or adjusted under 35 U.S.C. 154(b) by 452 days.

(21) Appl. No.: 13/857,125

(22) Filed: Apr. 4, 2013

(51) Int. Cl.
*H04Q 5/22* (2006.01)
*G06K 7/10* (2006.01)

(52) U.S. Cl.
CPC .................. *G06K 7/10297* (2013.01)

(58) Field of Classification Search
USPC ........................................ 340/10.5
See application file for complete search history.

(56) References Cited

U.S. PATENT DOCUMENTS

| | | | | |
|---|---|---|---|---|
| 7,450,010 B1* | 11/2008 | Gravelle | ............... | G06F 21/606 340/572.1 |
| 7,515,901 B1* | 4/2009 | Kaundinya | ............ | G06Q 10/08 380/247 |
| 8,332,645 B2 | 12/2012 | Dolev et al. | | |
| 8,412,937 B2* | 4/2013 | Maubach | ............... | H04L 9/0844 713/168 |
| 2008/0025496 A1* | 1/2008 | Smith | ..................... | G06F 21/64 380/28 |
| 2008/0106386 A1* | 5/2008 | Li | ........................ | H04L 63/0492 340/10.5 |
| 2010/0019883 A1* | 1/2010 | Eom | .................... | G06K 7/0008 340/10.1 |
| 2011/0107102 A1* | 5/2011 | Canard | ................. | H04L 9/3271 713/170 |

OTHER PUBLICATIONS

Wikipedia, Substitution-Permutation network, Jan. 24, 2010, pp. 1-2.*
Adams et al.—The Structures Design of Cryptographically Good S-Boxes.*
Ayoub—Probabilistic Completeness of Substitution-Permutation Encryption Networks.*
Baigneres et al.—Providing the Security of AES Substitution-Permutation Network.*
Mar et al.—New Analysis Methods on Strict Avalanche Criterion of S-Boxes.*
Wang Shao-hui et al., "Security Analysis of RAPP: An RFID Authentication Protocol based on Permulation," http://eprint.iacr.org/2012/327.pdf.

(Continued)

*Primary Examiner* — Quang Pham
(74) *Attorney, Agent, or Firm* — Miller, Matthias & Hull LLP

(57) ABSTRACT

A method comprises using at least one of a reader and a passive tag to exchange values according to an ultra-lightweight mutual authentication protocol with a substitution operation to change a Hamming weight of the values.

20 Claims, 4 Drawing Sheets

(56) References Cited

OTHER PUBLICATIONS

R.K. Pateriya, "An Ultralightweight Mutual Authentication Protocol for Low Cost RFID Tags," International Journal of Computer Applications (0975-8887), vol. 25—No. 10, Jul. 2011.

Yung-Cheng Lee, "Two Ultralightweight Authentication Protocols for LowCost RFID Tags," Appl. Math. Inf. Sci. 6 No. 2S pp. 425S-431S (2012).

* cited by examiner

ULTRA-LIGHTWEIGHT MUTUAL AUTHENTICATION PROTOCOL WITH SUBSTITUTION OPERATION

BACKGROUND

Radio Frequency Identification (RFID) systems may be passive or active. In a passive RFID system, a passive RFID tag harvests incident power from an RFID reader to run its circuitry, which transmits information back to the reader. The transmitted information may include unique identifying information about an asset being tracked, controlled, or managed.

In certain RFID systems, protecting the privacy of certain transmitted information is desirable. However, standard cryptographic protocols for authentication and privacy are not viable due to limited computational capabilities and constrained energy reserves of the passive tags.

A certain measure of privacy may be afforded by an ultra-lightweight protocol. A protocol such as a lightweight mutual authentication protocol (LMAP) employs simple bitwise and bit-shift operations, such as AND, OR and XOR. An ultra-lightweight protocol such as Strong Authentication and Strong Integrity (SASI) increases the weak security afforded by simple bitwise operations by adding a rotation operation. However, encryption strength is still relatively weak.

Moreover, SASI and other ultra-lightweight protocols are vulnerable to full disclosure and de-synchronization attacks. In a full disclosure attack, an attacker exploits certain vulnerabilities in the protocol to determine secret keys and other secret information stored in a tag. In a de-synchronization attack, an intruder is not necessarily interested in knowing the secret information. Rather, the intruder's goal is to manipulate the system such that the secret keys between the tag and the reader are not mutually updated. This form of attack leads to a denial of service because the reader will not be able to properly authenticate the tag or vice versa.

It is desirable to improve upon ultra-lightweight protocols to increase encryption strength and also to thwart full disclosure and de-synchronization attacks.

SUMMARY

According to an embodiment herein, a method comprises using at least one of a passive tag and a reader to exchange values according to an ultra-lightweight mutual authentication protocol with a substitution operation to change a Hamming weight of the values.

According to another embodiment herein, a communications device comprises a processor and memory encoded with data for causing the processor to perform information exchanges with another communications device according to an ultra-lightweight mutual authentication protocol with a substitution operation.

According to another embodiment herein, an article comprises computer-readable memory encoded with data for causing an RFID device to exchange values with another RFID device according to an ultra-lightweight mutual authentication protocol with substitution and permutation operations.

These features and functions may be achieved independently in various embodiments or may be combined in other embodiments. Further details of the embodiments can be seen with reference to the following description and drawings.

DETAILED DESCRIPTION

Figure 1:
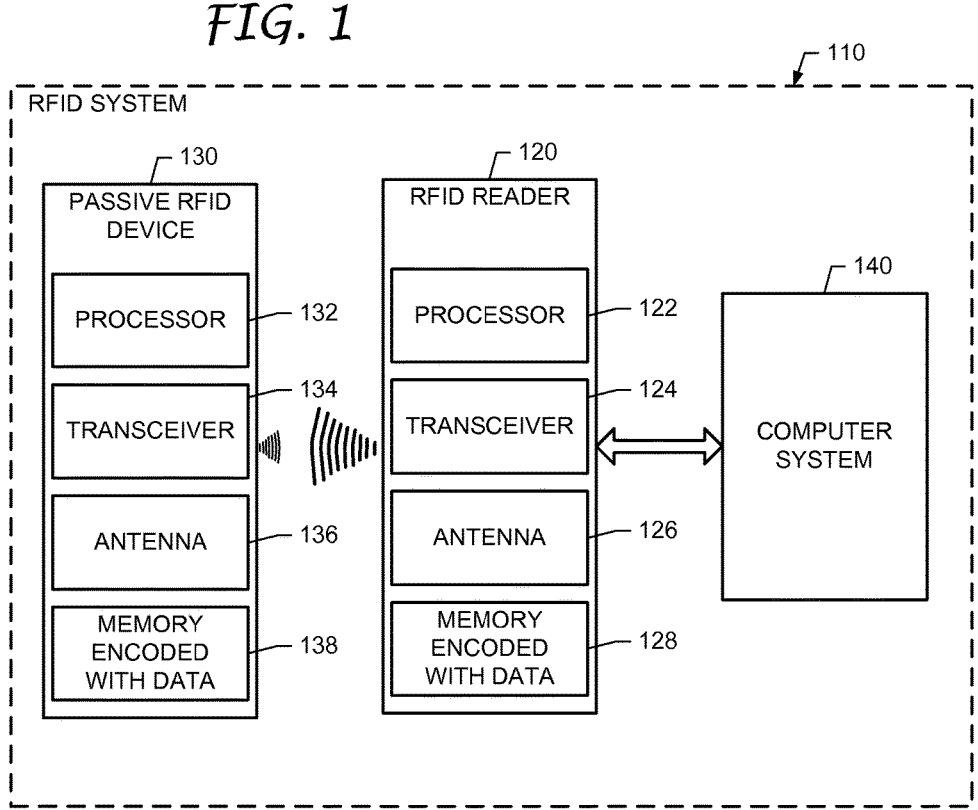
FIG. 1 is an illustration of an RFID system.

Reference is made to FIG. 1, which illustrates an RFID system 110 including an RFID reader 120 and a passive RFID device 130. The reader 120 may include circuitry such as a processor 122, a transceiver 124, an antenna 126, and machine-readable memory 128. The memory 128 is encoded with data that, when executed, causes the reader 120 to emit a magnetic field that provides operating power to the passive RFID device 130. The executed data may also cause the reader 120 to communicate with the passive device 130 and record its observations to a secure database 140 or other computer system 140.

The passive device 130 may include circuitry such as a processor 132, a transceiver 134, an antenna 136, and machine-readable memory 138, which may be non-volatile. Operating power for running the device circuitry may be harvested from the magnetic field. The memory 138 is encoded with data that, when executed, causes the passive device 130 to transmit information back to the reader 120. The information, which is also stored in the memory 138, may include secret information, (e.g., an ID or other unique identifying information about an asset) and non-secret information (e.g., a field for cyclic redundancy check). The secret information is encrypted before it is transmitted.

Unlike the reader 120, the passive device 130 has limited computational capabilities and constrained energy reserves. For instance, the harvested power enables the passive device 130 to operate for only several (e.g., tens of) milliseconds to perform and complete a communication session with the reader 120. Due to the limited computational capabilities and constrained energy reserves of the passive device 130, standard cryptographic protocols for authentication and privacy are not viable.

To protect privacy of the secret information, the reader 120 and the passive device 130 perform information exchanges according to an ultra-lightweight mutual authentication protocol with a substitution operation. The substitution operation changes a Hamming weight of values being exchanged, whereby the number of 1's and 0's in the values is changed. Changing the Hamming weight increases encryption strength over an ultra-lightweight protocol such as Strong Authentication and Strong Integrity (SASI).

The substitution operation may be performed in combination with a weak encryption method that changes positions of the bits in a message. Examples of the weak encryption method include, but are not limited to, a bitwise rotation, swap, or permutation. These operations do not change the content of a message. The substitution operation, on the other hand, changes the content and conceals the original content. The combination of permutation and substitution operations can be performed within limited computational capabilities and constrained energy reserves of the passive device 130.

A rotation operation may be performed instead of the permutation operation. However, the permutation operation provides a better transposition of data. In the permutation operation, bits of new positions cannot be easily guessed.

The permutation operation is not limited to anything in particular, so long as the reader 120 and the passive device 130 use the same operation. In some embodiments, a keyed permutation operation may be used, where the permutation function depends on a value of a key. In some embodiments, the following keyed permutation may be used. For two n-bit strings, X and Y, in the form $$X = x_1 x_2 \ldots x_n,\ x_i \in \{0,1\},\ i=1,2,\ldots,n$$

$$Y = y_1 y_2 \ldots y_n,\ y_i \in \{0,1\},\ i=1,2,\ldots,n$$

If the Hamming weight of Y, wt(Y), is m (0≤m≤n) and $$y_{k_1} = y_{k_2} = \ldots = y_{k_m} = 1$$

$$y_{k_{m+1}} = y_{k_{m+2}} = \ldots = y_{k_n} = 0$$

where $$1 \leq k_1 \leq k_2 \leq \ldots \leq k_m \leq n$$

and $$1 \leq k_{m+1} \leq k_{m+2} \leq \ldots \leq k_n \leq n$$

then, the permutation of X according to Y is $$\mathrm{Per}(X,Y) = x_{k_1} x_{k_2} \ldots x_{k_m} x_{k_n} x_{k_{n-1}} \ldots x_{k_{m+2}} x_{k_{m+1}}$$

The substitution operation is not limited to anything in particular, provided that both sides perform the same mapping. To limit the computations and power consumption, a single substitution box ("S-Box") may be used to map the values (each input value is replaced by a different one using a lookup table). In some embodiments, the following substitution operation may be used. Let $\mathrm{map}_{(x)}^r$ be the substitution of the value x by a value in the table whose index is mod(index(x)+r, 16). For two n-bit strings, X and Y, in the form $$X = x_1 x_2 \ldots x_n,\ x_i \in \{0,1\},\ i=1,2,\ldots,n$$

$$Y = y_1 y_2 \ldots y_n,\ y_i \in \{0,1\},\ i=1,2,\ldots,n$$

then $$\mathrm{Sub}(X,Y) = \mathrm{map}_{(x_0)}^{y_0} \parallel \mathrm{map}_{(x_1)}^{y_1} \parallel \ldots \parallel \mathrm{map}_{(x_k)}^{y_k},\ k = \frac{n}{4} - 1$$

where ∥ is a concatenation operation, and $$y_k = |y_{4k+1}, y_{4k+2}, y_{4k+3}, y_{4k+4}|$$

$$x_k = |x_{4k+1}, x_{4k+2}, x_{4k+3}, x_{4k+4}|$$

The RFID system 110 may include additional devices, both active and passive (not shown). The reader 120 may have sufficient computational capabilities and constrained energy reserves to communicate with multiple devices simultaneously and to communicate with the database 140. The reader 120 may communicate with additional passive devices according to an ultra-lightweight mutual authentication protocol with substitution and permutation operations (UMAP-SP). The reader 120 may communicate with additional active devices according to UMAP-SP or another protocol that is more computationally intensive.

The RFID system 110 may also include additional readers (not shown) that have access to the database 140. Each additional reader may communicate with the passive device 120 and any additional RFID devices.

Figure 2:
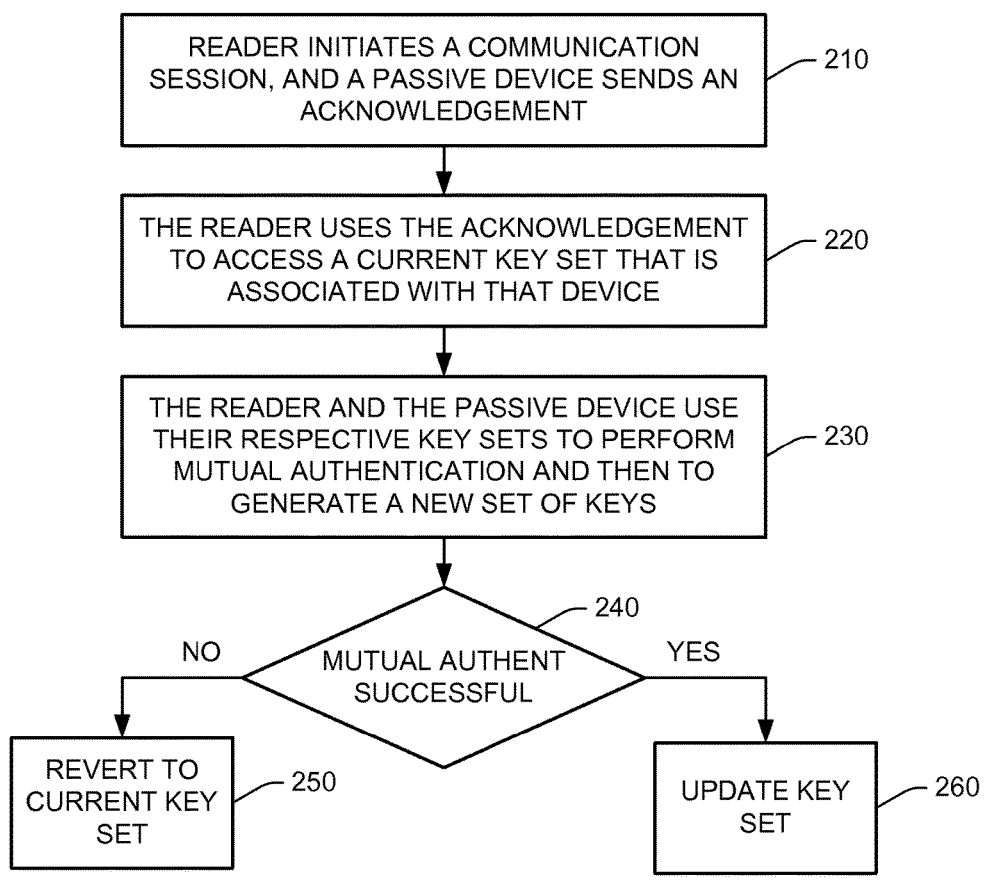
FIG. 2 is an illustration of a communication method according to an ultra-lightweight mutual authentication protocol with substitution and permutation operations.

Additional reference is made to FIG. 2, which illustrates a high-level communication method performed by the reader 120 and the passive device 130 according to UMAP-SP. The passive device 130 stores a current key set. The reader 120 has access (e.g., via the database 140) to a current key set that is associated with the passive device 130.

At block 210, the reader 120 initiates a communication session. For instance, the reader emits a magnetic field containing a message. If the passive device 130 is within range of the reader 120, the magnetic field will provide operational power to the passive device 130. In response to the message, the passive device 120 sends an acknowledgement (e.g., an index associated with that device 130) to the reader 120.

At block 220, the reader 120 uses the acknowledgement to access the current key set that is associated with that passive device 130. For instance, the reader 120 accesses the key set from the database 140.

At block 230, the passive device 130 and the reader 120 use their respective key sets to perform mutual authentication and then to generate new sets of keys. Permutation and substitution operations are performed during mutual authentication and new key generation.

If the mutual authentication is not successful (block 240), the reader 120 and the passive device 130 revert to their current key sets (block 250). If mutual authentication is successful (block 240), the reader 120 and the passive device 130 update their key sets with the new set of keys for future authentication (block 260).

The method of FIG. 2 enables secure communications to be performed in a low power environment with limited computational capability and limited session time. As will be demonstrated below, as few as five exchanges may be performed to authenticate and encrypt.

The method of FIG. 2 increases encryption strength, as the combination of permutation and substitution is stronger than simple bitwise operations. The method of FIG. 2 can prevent de-synchronization and full disclosure attacks. The set of keys in the passive device changes with each round of authentication, but only if the authentication is successful.

Figure 3:
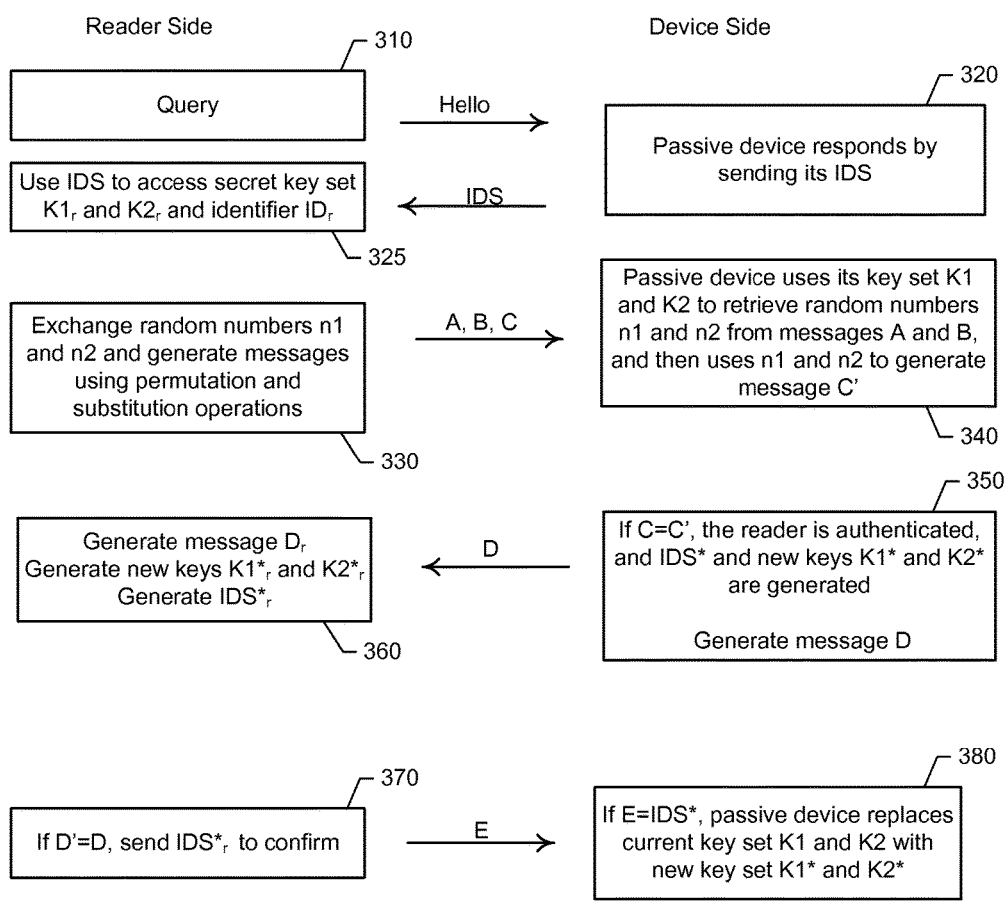
FIG. 3 is an illustration of a communication method according to an ultra-lightweight mutual authentication protocol with substitution and permutation operations.

Reference is now made to FIG. 3, which illustrates a communications method in which only five exchanges between the reader 120 and passive device 130 are needed to authenticate and encrypt. On the device side, the passive device 130 stores its secret key set K1 and K2 and other secret information including its identifier ID. In this embodiment, the passive device 130 does not have computational power to generate random numbers.

On the reader side, the database 140 stores information about the passive device 130, including its secret key set $K1_r$ and $K2_r$, and its identifier $ID_r$. The subscript "r" denotes information on the reader side, which may be different than the corresponding information on the device side. The database 140 may also store information about any additional passive devices.

Communication begins with first and second exchanges. The reader 120 broadcasts a message such as "Hello" (block 310). If the passive device 130 is within range of the reader 120, it responds by sending an index pseudonym (IDS) to the reader 120 (block 320). The IDS points to an entry in the database 140, which contains information about the passive device 130. The IDS may be dynamic. The device's ID is kept secret and is not sent at this point.

The reader 120 uses the IDS to access the secret information about the passive device 130, including the secret key set $K1_r$ and $K2_r$, and the identifier $ID_r$ (block 325). At this point, the reader 120 would not accept the identity of the passive device 130 because it has no guarantee that the IDS came from an authentic passive device 130.

The reader 120 and the passive device 130 then exchange random numbers and perform reader authentication (third exchange). In the embodiment of FIG. 3, two random numbers $n_1$ and $n_2$ are exchanged. These random numbers $n_1$ and $n_2$ will be used for mutual authentication and generation of new key sets.

In some embodiments, the reader 120 generates three messages A, B and C and sends the messages to the passive device 130 (block 330). The messages A, B and C may be generated using permutation and substitution operations as follows:

$$A = Per^{-1}(Sub^{-1}(n_1, K1_r), K2_r)$$

$$B = Per^{-1}(Sub^{-1}(n_2, K2_r), K1_r)$$

$$C = Per(Sub(ID_r, n_1), n_2)$$

where $Per^{-1}$ and $Sub^{-1}$ are inverse permutation and substitution operations. The first and second messages A and B are used to transmit the random numbers $n_1$ and $n_2$. The third message C will be used for reader authentication.

The reason for using the inverse operation on the reader side is due to the limited computational capabilities of the passive device 130. The substitution and permutation operations are done only in the forward direction on the device side, whereas the reader 120, which has far greater computational resources, can perform both the forward and backward (inverse) directions of substitution and permutation.

In other embodiments, however, the device 130 may be built with an inverse substitution and an inverse permutation. In those embodiments, the messages A and B may be generated with substitution and permutation operations.

The passive device 130 then uses its key set K1 and K2 to retrieve the random numbers $n_1$ and $n_2$ from messages A and B (block 340). The random numbers $n_1$ and $n_2$ may be retrieved as follows:

$$n_1 = Sub(Per(B, K2), K1)$$

$$n_2 = Sub(Per(B, K1), K2)$$

The passive device 130 then uses the random numbers $n_1$ and $n_2$ and its ID to generate the third message C', which is then compared to the message C sent by the reader (block 340). If C=C', then the reader 120 is authenticated to the passive device 130. The passive device 130 may generate the third message C' as follows:

$$C' = Per(Sub(ID, n_1), n_2)$$

If the reader 120 is authenticated, IDS and key set updates are performed (fourth exchange). Using the random numbers $n_1$ and $n_2$ and its key set K1 and K2, the passive device 130 generates a new IDS* and a new key set K1* and K2* (block 350). The new IDS* and new key set K1* and K2* may generated as follows:

$$K1^* = Per(Sub(K_2, n_2), n_1)$$

$$K2^* = Per(Sub(K_1^*, n_1), n_2)$$

$$IDS^* = Per(Sub(n_1, K_2^*), K_1^*)$$

The passive device 130 also generates a fourth message D and sends that message D to the reader 120 (block 350). This fourth message D will be used for authentication of the passive device 130 to the reader 120. The fourth message D may be generated as follows:

$$D = Per(Sub(ID, K_1^*), K_2^*)$$

The reader 120 receives the fourth message D, and then generates a new reader-side IDS*$_r$ and key set K1*$_r$ and K2*$_r$ (block 360). The new IDS*$_r$ and key set K1*$_r$ and K2*$_r$ may generated as follows:

$$K1_r^* = Per(Sub(K2_r, n_2), n_1)$$

$$K2_r^* = Per(Sub(K1_r^*, n_1), n_2)$$

$$IDS_r^* = Per(Sub(n_1, K2_r^*), K1_r^*)$$

The reader 120 then recreates the fourth message $D_r$ (block 360). The reader 120 may recreate the fourth message $D_r$ as follows:

$$D_r = Per(Sub(ID, K1_r^*), K2_r^*)$$

If D=$D_r$, then the passive device 130 is authenticated to the reader 120. A new key set K1$_r$* and K2$_r$* and a new index pseudonym IDS$_r$* are generated, and the new key set K1$_r$* and K2$_r$* is stored in the database 140 at the location indicated by IDS$_r$*. As a result, the reader 120 will maintain two sets of the index and keys. For a subsequent authentication session, the reader 120 determines which set to use based on the received IDS (either IDS$_r$ or IDS$_r$*).

If D=$D_r$, the key set update is then confirmed (fifth exchange). The reader 120 sends a fifth message E to the passive device, where E=IDS*$_r$ (block 370). The fifth message E may instead be another message that is a function of the new keys, but message E=IDS*$_r$ avoids giving an attacker multiple cipher texts.

If E=IDS*, then the key set on the reader side is the same as the key set on the device side. Therefore, the passive device 130 replaces the old key set K1 and K2 with the new key set K1* and K2* so it can thereafter use the new key set as the valid set between it and the reader 120 (block 380). The reader 120 should now expect the passive device 130 to use the new key set in the next authentication session. If, for any reason, the passive device 130 responds at the beginning of the new session with the old index pseudonym IDS, then the reader 120 can tell that the previous authentication session was not successful. If, however, the reader 120 receives the new index pseudonym IDS*, then that confirms to the reader 120 that no messages were lost during the previous authentication session. Thus, by maintaining the old and new sets of keys, the reader 120 avoids the risk of de-synchronization.

If the passive device 130 never receives the fifth message E (for instance, due to malicious or innocuous events), it will retain the old key set K1 and K2 and will not update to the new key set K1* and K2*.

The method of FIG. 3 offers advantages other than increasing encryption strength and thwarting full disclosure and de-synchronization attacks. The method offers forward security. The goal of forward security is to guarantee that a disclosure of the secrets at any time will not lead to disclosing all previous communications. Since the new set of keys depends on random numbers, which are not known to the attacker, the attacker will not be able to disclose the previous sets of keys and will only be able to reveal the current and all subsequent messages.

The method includes a double key confirmation, which enables the reader 120 to implicitly determine whether the last update was successful. The method also includes a double key update, which mitigates the effect of replayed messages, which can occur during replay attacks.

The method of FIG. 3 may instead use multiple rounds for computing the secret keys. For example, permute-substitutepermute-substitute (P-S-P-S) may increase security, but also increases the total number of computations.

A method herein is not limited to two secret keys and two random numbers. More than two keys and random numbers may be used to add to the complexity in case an intruder attempts to perform a brute force attack, but at the expense of more storage on both the reader and the passive device.

A method herein is not limited to RFID systems. It may be applied to other systems including readers and tags.

A method herein is not limited to any particular application. Examples include, but are not limited to, asset management, supply chain management, and the management of finance data and credit information.

Consider the case of asset management, where different parties have assets (e.g., tools, parts) located in a building. A method herein would allow one party to send and receive data without sharing the data with the other parties in the building.

Even if assets are controlled entirely by a single party at a single site, a method herein may be used to protect those assets from intruders. For instance, assets are managed on a site that is adjacent to property that is publicly owned or owned by another party. A method herein can thwart intruders from receiving secret information via commercially available readers on the adjacent property.

Figure 4:
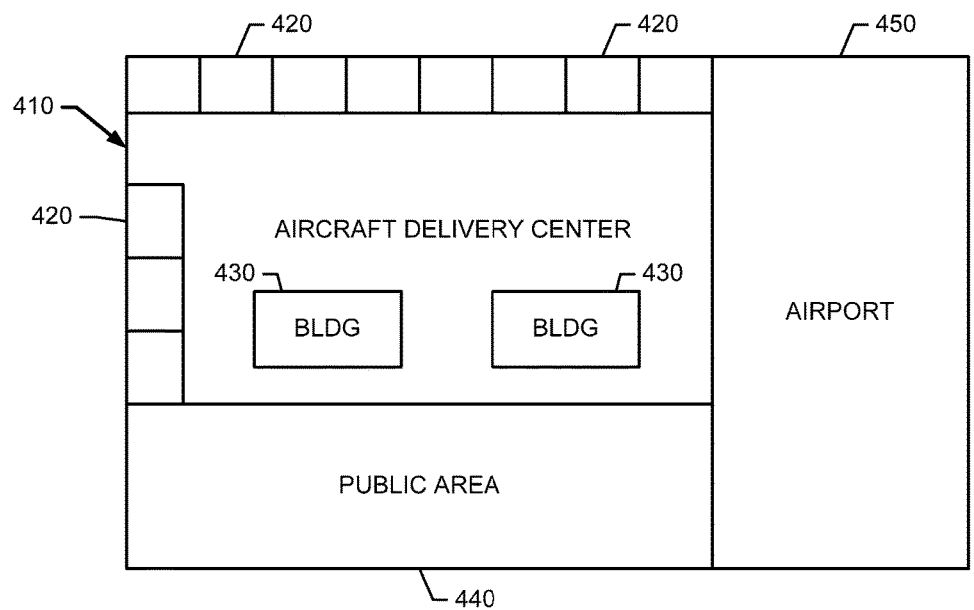
FIG. 4 is an illustration of an aircraft delivery center.

Reference is now made to FIG. 4. One particular example of asset management involves an aircraft delivery center 410. The aircraft delivery center 410 includes a plurality of aircraft stalls 420 and a plurality of buildings 430. Located within the delivery center 410 are assets including, but not limited to, aircraft, ground support equipment, test equipment and tools. Some or all of these assets may be tagged with passive RFID devices. RFID readers may be located in each aircraft stall. For instance, RFID readers may be installed on poles or attached to light posts. RFID readers may also be located on top of small buildings 430.

The aircraft delivery center 410 may be owned by a company. However, the delivery center 410 is adjacent to land that is not owned by that company. In the example of FIG. 4, the aircraft delivery center 410 is adjacent to public property (e.g., roads and public parking) 440 and an airport 450. The airport 450 is where test flights are performed by company pilots prior to delivery to airline carriers. To protect the privacy of the assets, the passive RFID devices may communicate with the readers in accordance with a method herein.

The invention claimed is:

1. A method comprising using at least one of a reader and a passive tag to exchange values according to an ultra-lightweight mutual authentication protocol with a substitution operation, the substitution operation being performed during each mutual authentication and changing a Hamming weight of each of the values exchanged.

2. The method of claim 1, wherein the reader is an RFID reader and wherein the passive tag is a passive RFID device.

3. The method of claim 2, wherein a weak encryption operation is used in combination with the substitution operation; and wherein the passive tag performs the substitution operation only in a forward direction and the RFID reader performs the substitution operation in both forward and backward directions.

4. The method of claim 3, wherein the weak encryption operation includes a permutation operation.

5. The method of claim 4, wherein the permutation operation is a keyed permutation operation.

6. The method of claim 4, wherein the passive tag stores a current device-side key set, and the reader accesses a current reader-side key set associated with the passive tag; and wherein during a communication session, the passive tag and the reader use their respective key sets to perform mutual authentication and then to generate new sets of keys, the permutation and substitution operations performed during the mutual authentication and new key generation.

7. The method of claim 6, wherein the reader and the passive tag each generates its own new key set using shared random numbers.

8. The method of claim 6, wherein the current key sets are used to authenticate the reader to the passive tag, and the new key sets are used to authenticate the passive tag to the reader.

9. The method of claim 6, wherein if the mutual authentication is not successful, the passive tag reverts to its current key set; otherwise, the passive tag updates its key set with the new set of keys for future authentication.

10. The method of claim 9, wherein the reader maintains its current and new key sets even if the mutual authentication is successful.

11. The method of claim 10, wherein the reader determines which key set to use based on a received index pseudonym (IDS) from the passive tag.

12. The method of claim 6, wherein a first exchange between the reader and the passive tag is initiated by the reader, wherein the passive tag responds with a second exchange by sending an index pseudonym (IDS) to the reader; and wherein the reader uses the IDS to access its key set associated with the passive tag.

13. The method of claim 12, wherein a third exchange between the reader and the passive tag is performed, with the reader generating random numbers, creating encrypted messages from the random numbers and identifier (ID) using its current key set, and sending the messages to the passive tag, which uses its current key set to recover the random numbers and authenticate the reader to the passive tag.

14. The method of claim 13, wherein the reader generates the messages using inverse substitution and inverse permutation so that the passive tag performs the substitution and permutation only in a forward direction.

15. The method of claim 13, wherein a fourth exchange between the reader and the passive tag is performed, wherein the reader generates a new key set and IDS using the reader-side current key set and ID; and wherein the passive tag generates a new key set and IDS using the device-side current key set and ID.

16. The method of claim 15, wherein a fifth exchange confirms the passive tag to the reader, wherein the reader saves the new key set and IDS and sends a confirmation message to the passive tag.

17. The method of claim 16, wherein the passive tag updates its key set if and only if it receives the confirmation message.

18. A communications device comprising a processor and memory encoded with data for causing the processor to perform information exchanges with another communications device according to an ultra-lightweight mutual authentication protocol with a substitution operation, the substitution operation being performed during each mutual authentication and changing a Hamming weight of each of the values exchanged.

19. An article comprising computer-readable memory encoded with data for causing an RFID device to exchange values with another RFID device according to an ultra-lightweight mutual authentication protocol with substitution and permutation operations, the substitution operation being performed during each mutual authentication and changing a Hamming weight of each of the values exchanged.

20. The article of claim 19, wherein the data further causes the RFID device to function as a passive RFID tag.

\* \* \* \* \*